March 18, 1930.  W. S. DAVENPORT ET AL  1,750,836
AUTOMATIC MACHINE TOOL
Filed Feb. 13, 1926  8 Sheets-Sheet 1

INVENTOR
William S. Davenport.
William A. Thomas.
BY
their ATTORNEYS

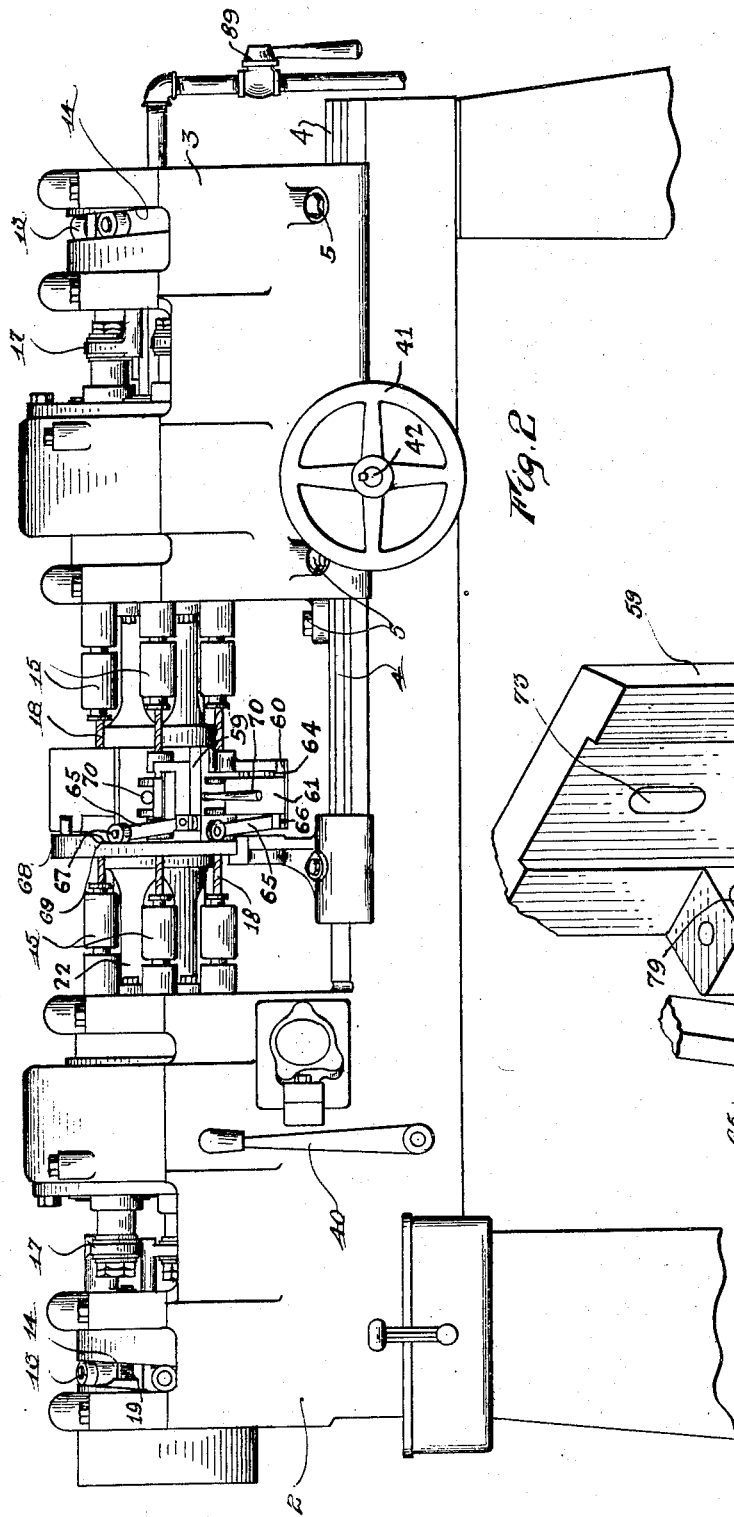
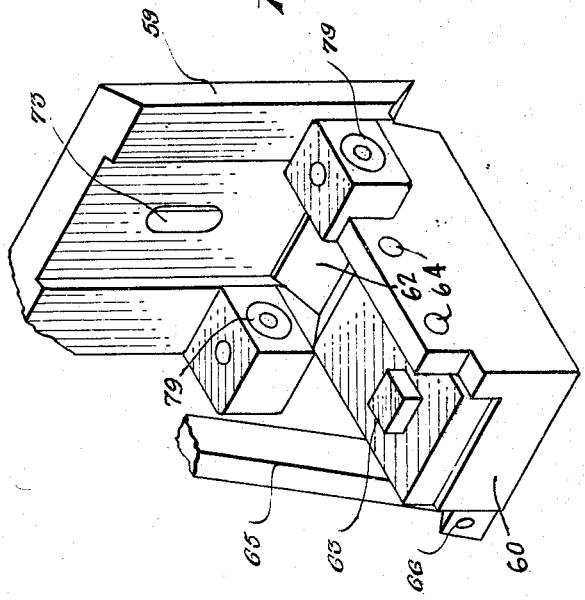

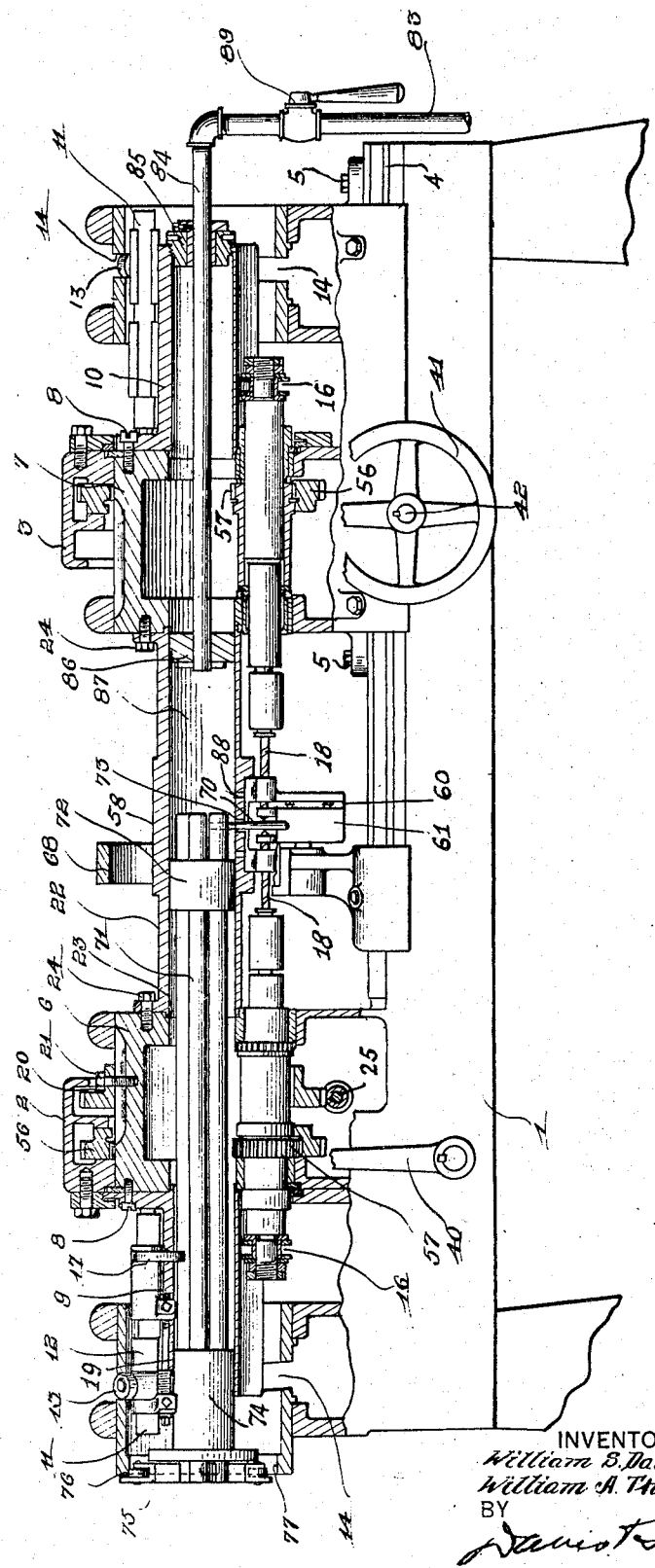

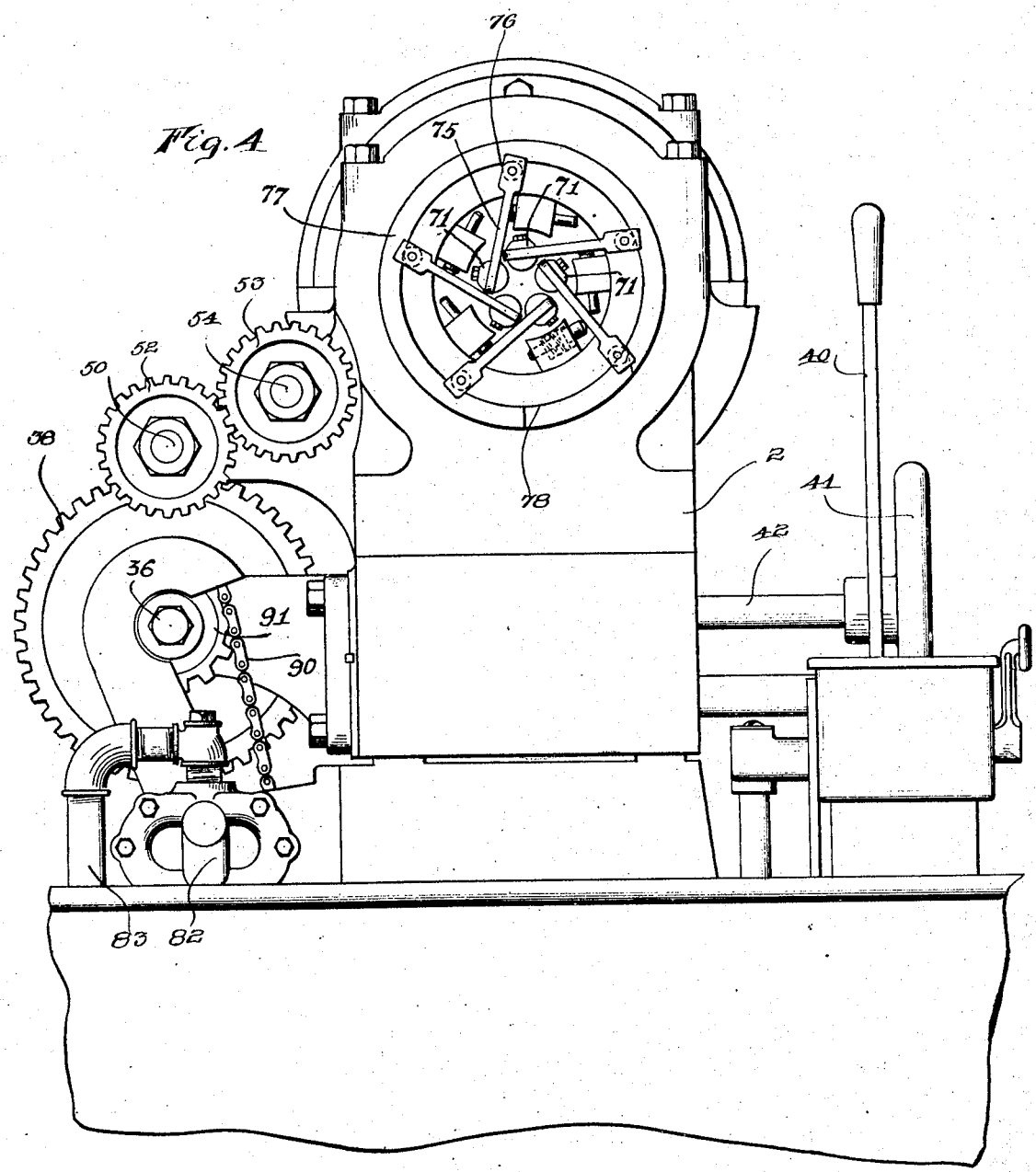

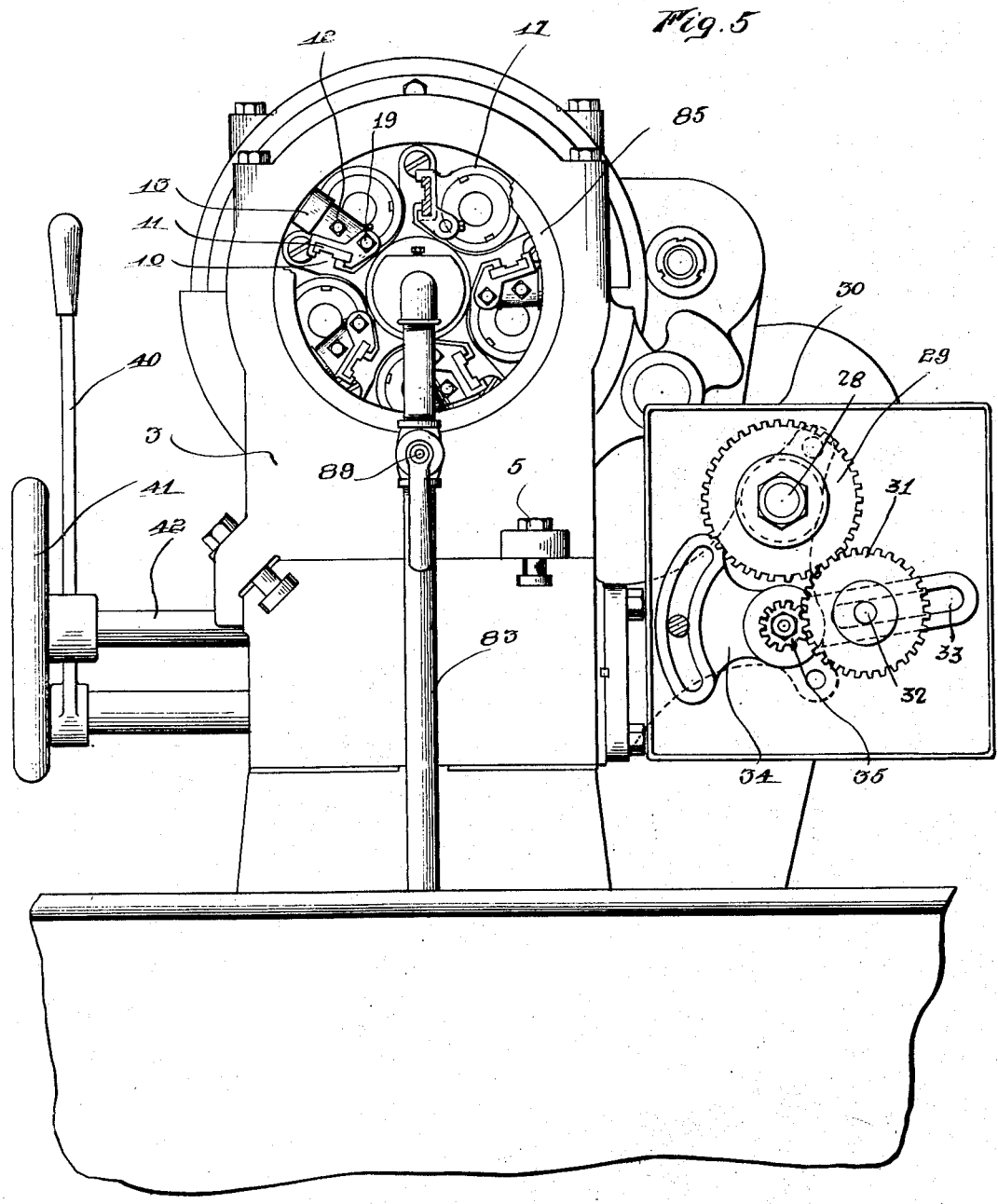

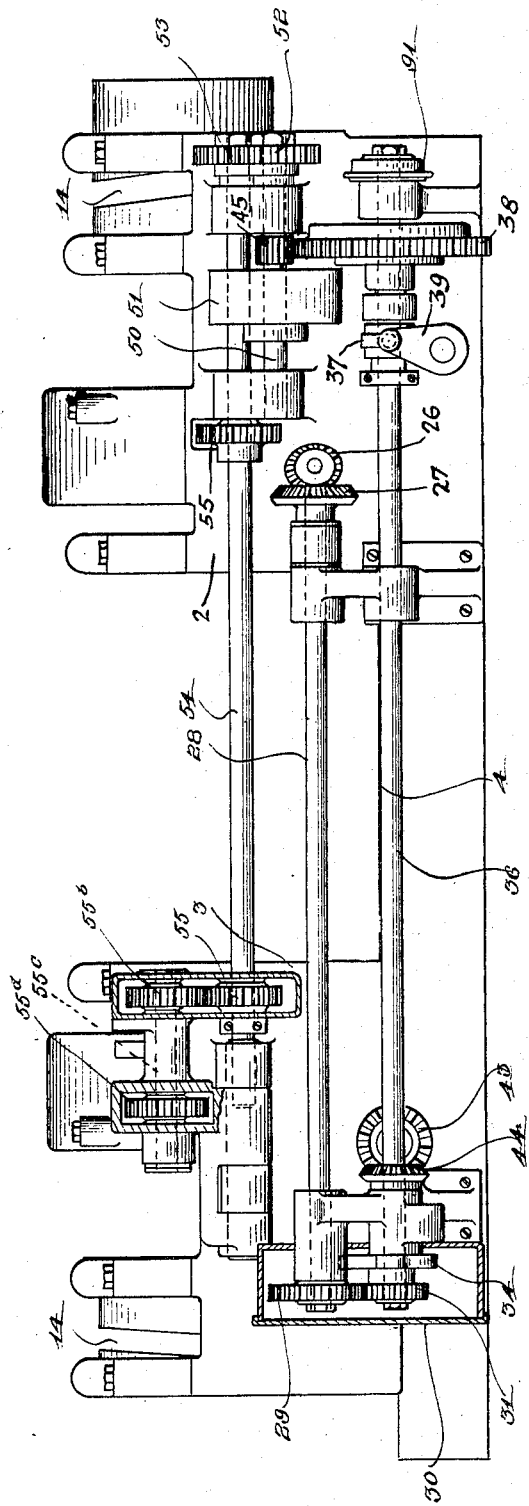

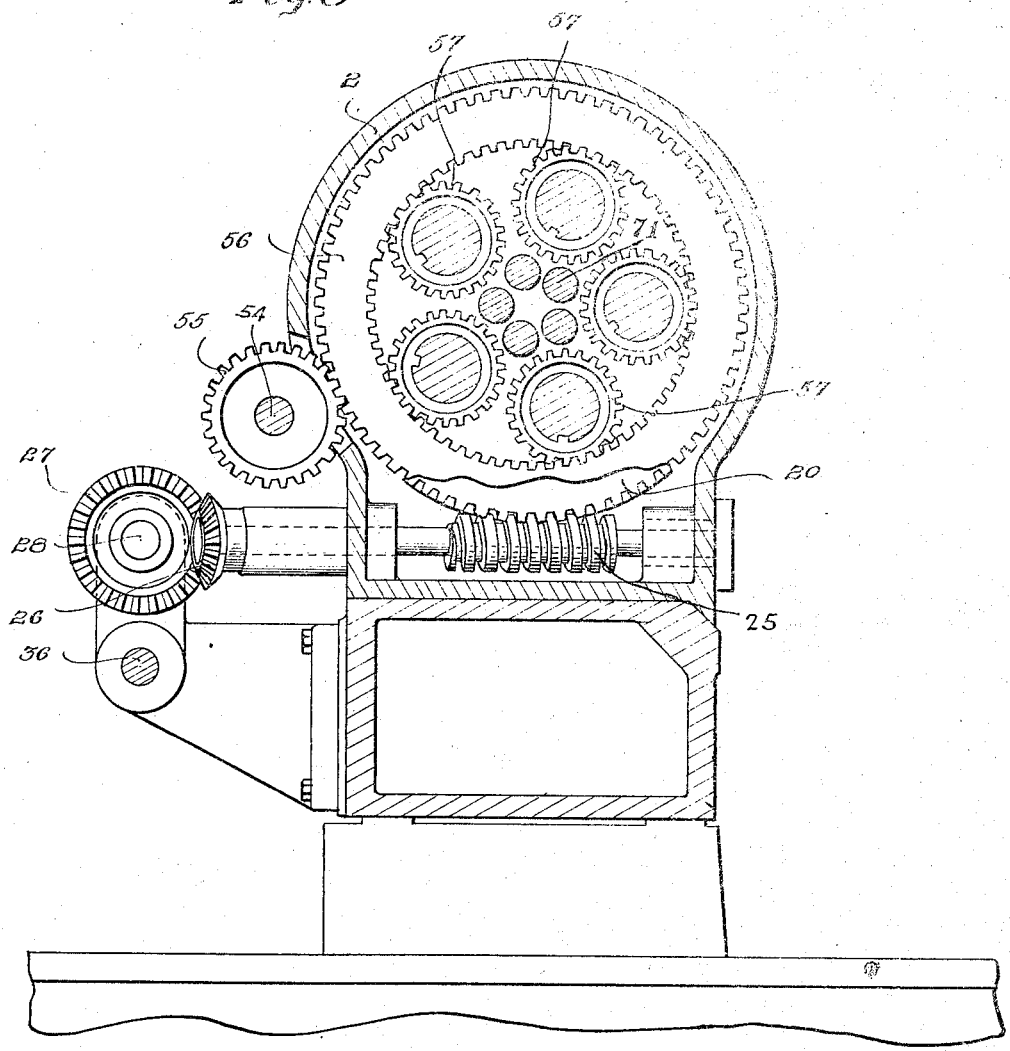
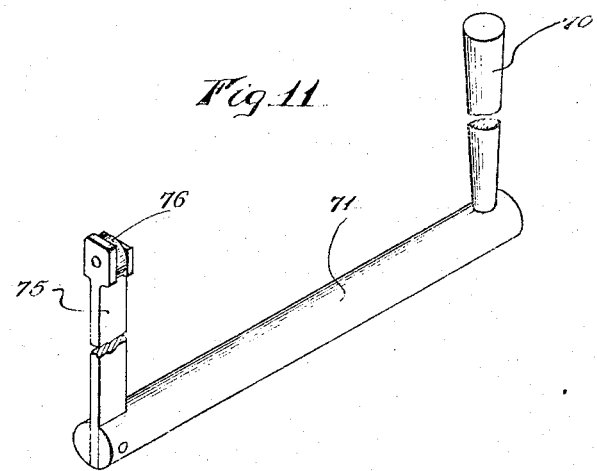

Patented Mar. 18, 1930

1,750,836

UNITED STATES PATENT OFFICE

WILLIAM S. DAVENPORT AND WILLIAM A. THOMAS, OF ROCHESTER, NEW YORK, ASSIGNORS TO DAVENPORT MACHINE TOOL CO., INC., OF ROCHESTER, NEW YORK, A CORPORATION

AUTOMATIC MACHINE TOOL

Application filed February 13, 1926. Serial No. 88,042.

The present invention relates to automatic machine tools and an object thereof is to provide a construction in which two rotary heads each having a set of tools projecting toward the other set and axially movable thereon, are connected by a part which causes the heads to turn together and which acts as a support for work simultaneously operated upon by the two sets of tools. A further object of the invention is to provide an automatic tool machine having a hollow rotary head on which the tool spindles are rotatable and axially movable, combined with work holding devices which turn with the head to hold the work in cooperation with the tool and are controlled by means extending through the hollow rotary head and operated in turn by means at the opposite end of the head.
To these and other ends, the invention consists of certain parts and combinations of parts, all of which will be hereinafter described, the novel features being pointed out in the appended claims.
In the drawings:

Fig. 2 is a front view of the machine;

Fig. 3 is a longitudinal section through the machine;

Fig. 4 is an end view of the machine;

Fig. 5 is a view of the opposite end of the machine with parts broken away;

Fig. 6 is a view of the frame of the machine, illustrating the driving mechanism for the spindles and rotary carrier or turret with parts in section;

Fig. 8 is an enlarged section on the line 8—8, Fig. 1;

Figs. 9 and 10 are detail views of the work holding means; and

Fig. 11 is a detail view of one of the clamping devices showing the shaft on which it is mounted and the operating lever at the opposite end.

Figure 1:
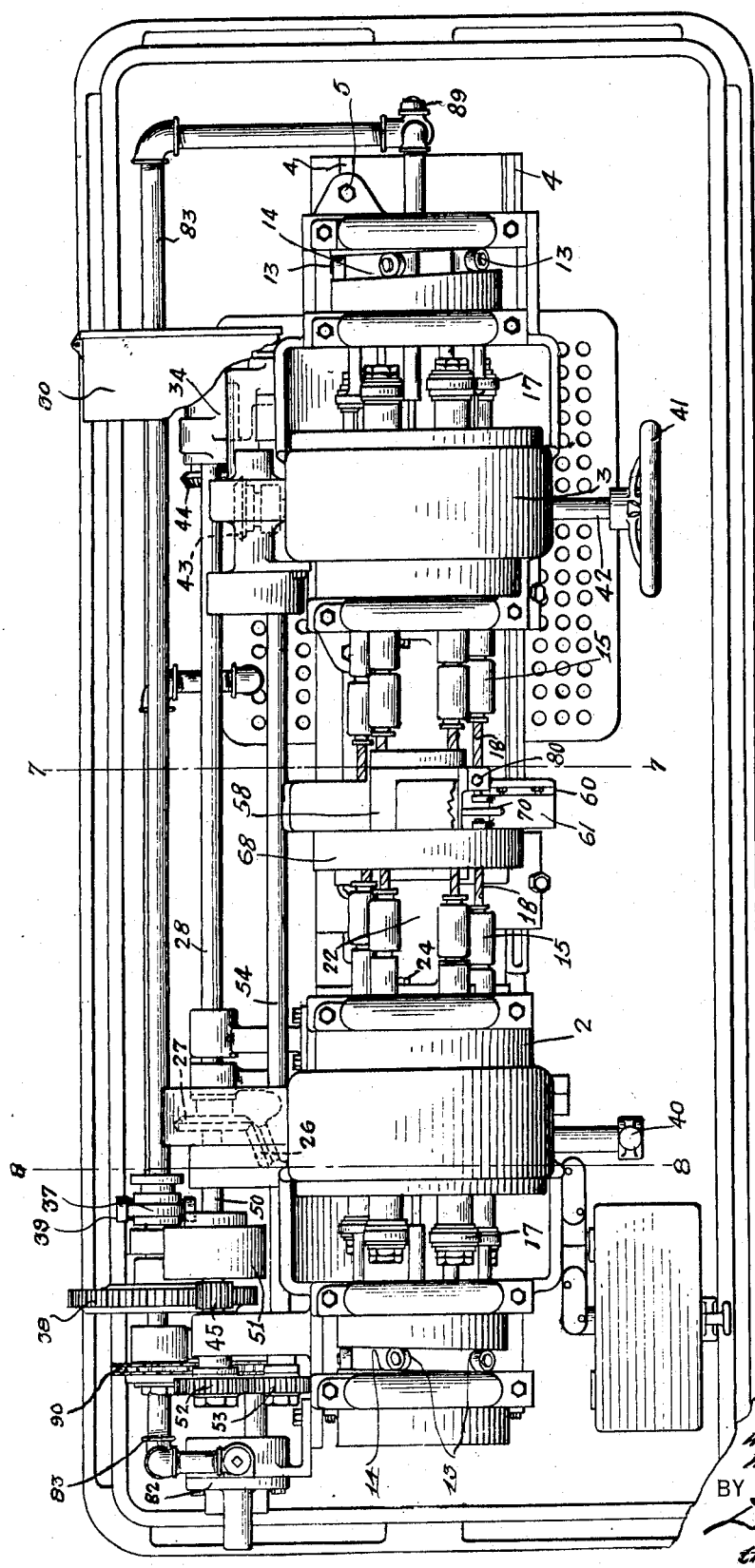
Fig. 1 is a plan view of a machine constructed in accordance with this invention.
Figure 7:
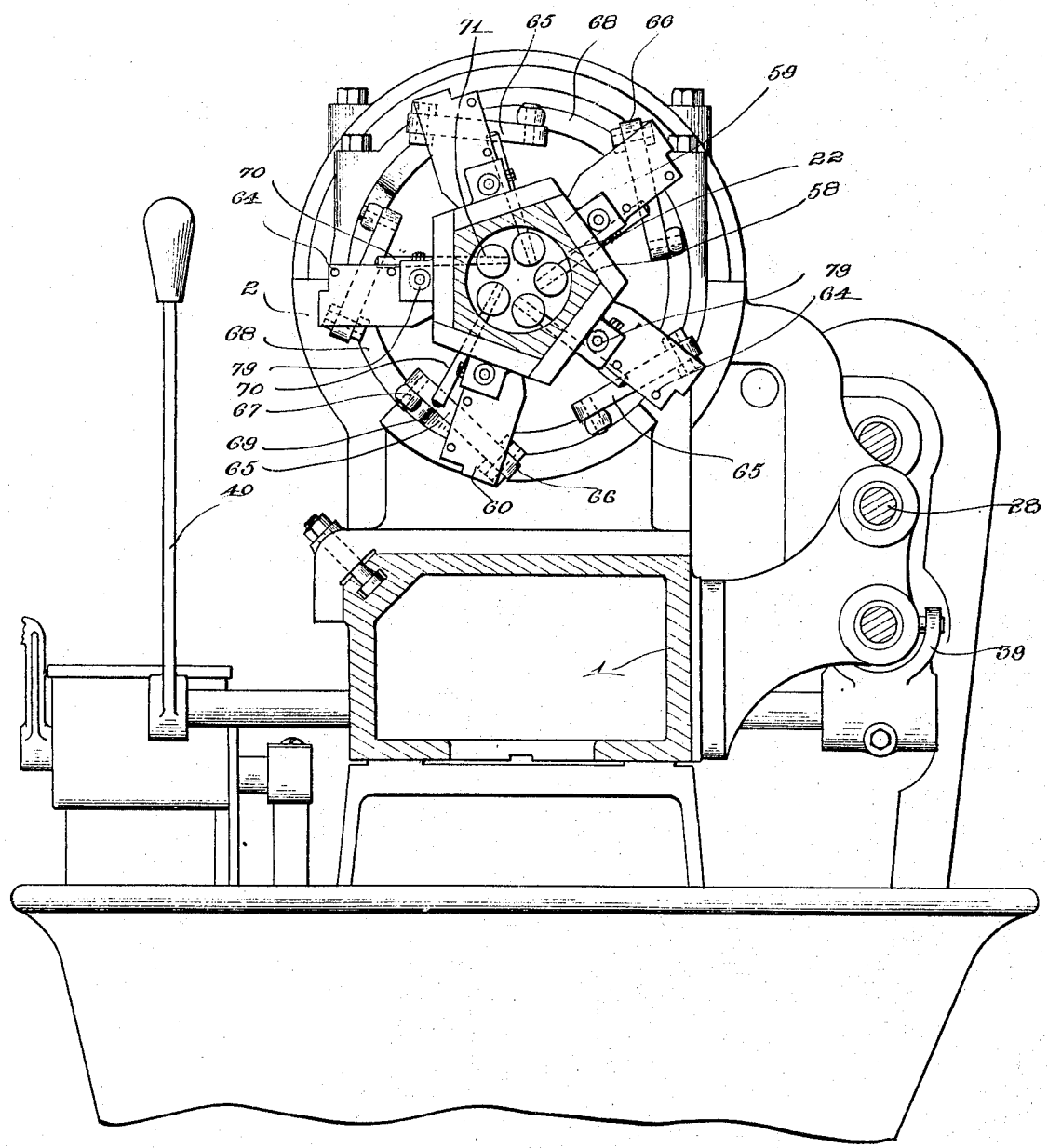
Fig. 7 is an enlarged section on the line 7—7, Fig. 1;

Referring more particularly to the drawings, 1 indicates the bed of the machine which may be of any suitable construction. On this bed are arranged two housings or frame pieces 2 and 3, the housing or frame piece 2 being preferably cast integral with the bed and the housing or frame piece 3 being adjustable horizontally on the bed toward or from the frame piece 2. In this instance, the bed 1 has horizontal guides 4 and the housing or frame piece 3 carries bolts 5 which secure the housing or frame piece to the bed in a fixed position with reference to the housing or frame piece 2.

Mounted to turn in the frame pieces or housings 2 and 3, respectively, are two revolving tool spindle heads or carriers 6 and 7. Turning with these heads, respectively, and bolted thereto at 8 are two slide brackets 9 and 10. Each of these slide brackets has guides 11 mounted thereon and supporting slides 12 each of which carries a roller 13 movable in a cam way 14 formed on the housings 2 or 3 to shift the slides 12 in order to operate the drill spindles 15 back and forth. The drill spindles 15 are, in this instance, mounted to rotate upon and to slide axially on the revolving heads 6 and 7, and each is formed at its outer end with an annular groove 16 in which a projection or yoke 17 on the slide 12 operates, so as to cause the drills 18 to move toward and from the work. The depth of the cut of each drill is determined by adjusting the two parts of each slide 12 by means of an adjusting screw 19.

The turning of the heads 6 and 7 may be effected in any suitable manner as through a ring gear 20 which is secured by bolts 21 to the head 6, the head 6 being connected with a head 7 through a tubular connection 22, the ends of which are formed with annular ribs 23 seated in grooves in the heads 6 and 7 and held in such seats by bolts 24 making it possible to remove this tubular member 22, another function for which will hereinafter be set forth. With the ring gear 20 may engage a worm 25 which has on the shaft thereof a bevelled gear 26, meshing with the bevelled gear 27 on a shaft 28 extending longitudinally of the bed frame.

This shaft 28 has at its opposite end a gear 29 arranged in the housing 30 which also encloses a gear 31, the gear 31 being mounted on a stub shaft 32 which is adjustable in a slot 33 of a swinging bracket 34 also mounted in the housing 30. The gear 31 meshes with a gear 35 on the driving shaft 36. The purpose of this gearing in the housing 30 is to make it possible to obtain different speeds of head rotation. The gears 31 and 35 are removable so that gears of other sizes may be fitted in place to obtain different speeds.

The shaft 36 has a movable clutch member 37 thereon adapted to engage with the clutch surface on a gear 38 and controllable through a yoke 39 which is operated by a hand or feed starting lever 40 on the opposite side of the machine. This shaft 36 may also be turned by hand through a hand wheel 41 at the front of the machine on a shaft 42 extending to the rear and having a bevelled gear 43 thereon meshing with the bevelled gear 44 on the shaft 36 permitting the turning of the revolving head by hand, provided, of course, the clutch 37 is not in connection with the gear 38. The gear 38 meshes with a pinion 45 on a drive shaft 50 on which the drive pulley 51 is arranged, the drive pulley being driven in any suitable manner.

The driving of the spindles may be effected in any suitable manner as from the shaft 50 by a gear 52 on said shaft meshing with the gear 53 on the spindle drive shaft 54. This spindle drive shaft 54 carries two gears 55 and 55$^a$, the former of which meshes with one of two ring gears 56, each ring gear having teeth on its annular and external perimeters, the external teeth engaging the gear 55 and the internal teeth engaging pinions 57. The other gear 55$^a$ meshes with gear 55$^b$ on a stub shaft 55$^c$ which carries a gear 55$^d$ meshing with the other ring gear 56.

The tubular member 22 acts as a jig holder for the jigs or work holders. To this end the tubular member 22 has its walls flattened at 58 to provide seats for the jig plates 59. These jigs or work holders of which one is shown in detail are shown in Figs. 9 and 10. Each jig plate 59 has an arm 60 extending laterally therefrom and work supporting or holding means on one face thereof. In this instance, the work shown at 61 is a hinge plate in which two holes are to be drilled in opposite sides. The work rests in a V shaped groove 62 and also on a stud 63. At one side the work holder has two adjustable screw abutments 64 which define the position of the work piece on the work holder. In this instance, the work 61 is held on the work holder by two clamping means.

One of these clamping means is in the form of a clamping lever 65 which is pivoted at 66 to the arm 60 and carries at its free end a roller 67 which cooperates with a fixed controlling member 68 in the form of a ring cam. This ring cam has a depressed portion 69 which, when the rollers 67 lie therein, permit the levers 65 to lie in non-clamping position, but as these rollers 67 move out of this depressed portion 69 the levers 65 move to clamp the work on the work support against the adjustable abutments 64. As the clamping members turn with the jig holder and consequently the revolving tool spindle head, it is apparent that the work pieces will be clamped in the work holders during a portion of the turning of the revolving head and will be free during another portion. When they are clamped by the clamping pieces 65, the work piece will be operated upon by the drill 18 and when the clamps 65 are in unclamping position, the drills will be withdrawn from the work pieces.

The other clamping devices 70 cooperate with the face of the work piece 61 and, in this instance, comprises an arm in the form of a tapered pin driven into a shaft or rod 71 which is mounted to rock or turn in a bearing block 72 arranged within the tubular jig holder 22, the jig holder having an opening or slot 73 through which the clamping arm 70 extends and there being provided five or these arms to correspond in number to the number of work holders and drill spindles in each head 6 or 7. The shafts 71 extend through the tool spindle head 6 to and through a block 74 which is fitted within the slide bracket 9 to one end of the machine. Each of these shafts 71 may be provided at the end of the machine with an arm 75 carrying a roller 76 which travels on the inner face of a cam or fixed member 77 arranged at the end of the machine. This cam has a depressed portion 78 which when the rollers 75 enter effects the swinging of the clamp 70 to release the work piece 61, but when the rollers engage the high point of the cam 77, the arms or clamping members 70 are shifted toward the work piece 61. It is apparent that the shafts 71, by being mounted on blocks 72 and 74 rigid with the tool spindle heads, revolve with the tool spindle heads or carrier, and, at the same time, have motion about their own axes under the action of the arms 75. In this way, while the tool revolving heads or carriers 6 and 7 are turning with the jig holder 72, the work is clamped and released at certain periods, so that while the tools 18 are operating on the work, it will be held by the arms 70 and, after such operation and withdrawal of the tools, the arms 70 will release the work. The arms 70 and the arms 65 cooperating with a single work piece, engage or release the work substantially at the same time.

In order that the drills or tools 18 may be guided to the work piece 61, while it is held, the opposite sides of the arm 60 are provided with openings in which steel bushings 79 are arranged, these bushings being secured in place by set screws 80 and having openings 81 in which the drills or tools may pass.

In order to supply oil to the drills, an oil pump 82 is provided which through a piping 83 connects with a piping 84 extending through the slide bracket 10 and revolving head 7, the slide bracket having the bushing 85 in one end and the jig holder having a bushing 86, both of these bushings turning on the piping and the piping discharging in a chamber 87 in the jig holder in the bushing 86 and the block or head 72, this chamber having discharge openings 88 directly opposite the drills so that the oil flows on the work during the operation of the drills or tools. A valve 89 in the piping 83 controls the flow of lubricant to a chamber 87. The pump is driven in any suitable manner as by a chain 90 which connects with the pulley 91 on a common shaft with the gear 38.

The operation of the invention is as follows: The work piece 61 is placed upon a work supporting arm 60 while the clamping members 65 and 70 of said arm are shifted to unclamping positions and the drills or tools are moved away from the work. The work support or jig holder during this time is rotating slowly and, at the same time, all of the drills are turning, each drill operating upon a work piece in one of the work holders. Shortly after the work piece is placed upon a work holder, the clamping members 65 and 70 engage therewith to hold the work to the work support in two directions. About this time the drills which are to operate upon this work piece move axially toward the work piece and this axial movement continues while the work piece is revolving with the carrier until the drilling operation is completed; after which the drills are again withdrawn through the cams 14 and the jaws or clamping members release the work piece, permitting the latter to be discharged by gravity due to the fact that the discharge point is at the underside of the revolving head. The clamps 65 are operated by a stationary cam or element 68 surrounding the jig holder, whereas the operation of the clamps 70 are effective through the rotation of the shafts 71 arranged in annular series in the revolving head or carrier 6 and turning with the latter, so as to cause the roller 76 on the arm 75 to engage with a stationary cam 77 at one end of the machine. The drills 18 move in and out through the axial operation of the drill spindles by means of the cams 14 engaging rollers 13 on the slides 12, the spindles being mounted on the revolving element or carrier formed by the two heads 6 and 7 connected by the jig holder 22. During the operation of the tools or drills 18, lubricant is fed to the tools adjacent their drilling points by means of openings 88 in a chamber 87.

What we claim as our invention and desire to secure by Letters Patent is:

1. An automatic machine tool comprising two rotary tool carrying heads, two spaced bearings surrounding said heads and in which said heads turn about a common axis, means supporting one of said bearings so that it may be moved in the direction of the axis of rotation of its head, toward and from the other to vary the distance between the heads and a work supporting connection detachably secured to both of the heads and rotatable coaxially with the latter.

2. An automatic machine tool comprising a pair of rotary heads, a connection between the heads causing the heads to turn together, two sets of tools, one set being mounted on each head and each tool being rotatably and axially movable on the head, the tools of the two sets projecting toward each other, and work holding devices arranged on the connection between the two heads and turning with said heads, each work holding device having a clamping member for holding a work piece while a tool from both sets operates thereon, and means for automatically effecting the operation of said clamping members, said means comprising a fixed ring shaped member surrounding the connection between the two heads between the ends of the latter.

3. An automatic machine tool comprising a bed, a fixed housing on the bed, an adjustable housing on the bed, two rotary tool spindle heads mounted to turn in the two housings, a detachable member connecting both heads and rotatable coaxially with both heads, two sets of tool spindles, one set on each head extending toward the other set, said tool spindles being rotatable and axially movable on the heads, and work holding means arranged on the detachable connection between the heads.

4. An automatic machine tool comprising two rotary heads mounted to turn about a common axis, two sets of tools, each set being mounted on one of the heads, the tools of the two sets projecting towards each other and being rotatably and axially movable on the heads, means permitting the relative adjustment between the heads, a connecting member detachably connected to both heads and rotatable with both heads about the axis of rotation of said heads, a plurality of work holding devices equal in number to the number of tools in each set for holding work mounted on said connecting member for operation upon by both sets of tools, each work holding device having a pivoted clamping member for holding a work piece thereon, and fixed means surrounding said connecting member and arranged in the path of travel of the work holding devices for effecting the operation of said clamping member.

5. An automatic machine tool comprising a hollow rotary head, tool spindles rotatable and axially movable on said head about the axis of rotation of the head, work holding devices turning with the head for holding the work for operation upon by the tools at one end of the head, controlling means for said work holding devices extending through the hollow head, and means at the end of the head opposite the work holding devices for effecting the movement of said controlling devices.

6. An automatic machine tool comprising a rotary hollow head, a tubular member secured to the head, work holding devices secured to the tubular member and having movable clamping members, tools mounted on the head to turn therewith and having rotary and axial movement on the head to operate on work held by the work holding devices, a cam mounted in fixed relation to the rotary head on a side thereof opposite the tubular member, oscillatory rods mounted in the head to turn with the head and connected with the work holding clamps and with the fixed cam so that the fixed cam effects the operation of the work holding clamps as the head turns.

7. An automatic machine tool comprising a rotary hollow head, a hollow slide bracket projecting from one side of the head, a hollow member connected to the opposite side of the head, work holding devices mounted on said hollow member and each having a work holding clamp, a slide movable on the slide brackets, tool spindles mounted for axial movement and rotary movement on the head and connected with the slides, a fixed cam by which said slides are moved for effecting the axial movement of the tools, means for turning the tools, a fixed cam beyond the end of the hollow slide bracket, rods mounted to turn with the rotary head and to oscillate, said rods being each connected at one end with a clamp of a work holding device, and means at the opposite end of each rod for effecting the oscillation of the rod.

8. An automatic machine tool comprising a pair of rotary hollow heads, a hollow connection between the head, hollow slide brackets projecting from the outer ends of the heads, work holding devices mounted on the hollow connection and each having a work holding clamp, said hollow member having adjacent said work holding devices openings through which the lubricant may be fed, two blocks mounted within the tubular connection to provide a lubricant chamber, a piping extending through one of the hollow slide brackets and one of the heads and connecting with said chamber to feed a lubricant thereto, two sets of tools, one set being mounted on each of the heads, the two sets projecting toward each other to cooperate with the work pieces on the work holding devices, said tools being mounted for axial and rotary movement on their respective heads, slides mounted on the slide brackets and connected with the tools for effecting the axial movement of the tools, fixed means cooperating with the slides to effect the movement of the slides, and means extending through one of the blocks in the hollow connecting member and through one of the heads and one of the slide brackets for effecting the operation of the clamps of the work holding devices.

9. An automatic machine tool comprising a rotary hollow head, axially movable and rotary tool spindles on the head, a gear on each spindle, an annular rotary internal and external gear surrounding the tool spindles and meshing with the gears thereon to turn said spindles, work holding means at one end of the head, controlling means for the work holding means extending through the hollow head and the annular gear, and means for driving the annular gear through the external teeth.

10. A machine tool comprising a rotary hollow head, rotary tool spindles arranged about the axis of rotation of the head and movable in the direction parallel with the axis of rotation of the head, a hollow slide bracket projecting from the head opposite the end from which the tools project, guides on said bracket, slides on the guides, each connected to one of the spindles, a hollow member projecting from that end of the head from which the tools project, work holding means mounted on said hollow member, a housing surrounding the slide bracket and formed with a cam cooperating with the slides to effect the axial movement of the tools, and a second cam carried by said housing and having connection with the work holding means extending through said hollow slide bracket, hollow rotary head and hollow member at the tool opposite the end of the head.

11. An automatic machine tool comprising a horizontally rotatable head, rotary tool spindles arranged about the axis of rotation of said head and movable axially parallel with the axis of rotation of said head, a slide bracket extending from said head opposite the end from which the tools extend, guides on said bracket, slides on the guides each connected to one of the tool spindles, means cooperating with the slides for effecting the axial movement of the tools, a hollow member projecting from the head centrally of the tools and provided with lubricant discharging openings, work holding devices supported on said hollow member, and non-rotating means for feeding a lubricant through the slide bracket and the hollow rotary head and into the hollow member to feed the lubricant to the work holding devices on said hollow member.

WILLIAM S. DAVENPORT.
WILLIAM A. THOMAS.